Patented Mar. 13, 1923.

1,448,290

UNITED STATES PATENT OFFICE.

ERNST FRIEDBERGER, OF BERLIN, GERMANY, ASSIGNOR, BY MESNE ASSIGNMENTS, TO THE CHEMICAL FOUNDATION, INC., A CORPORATION OF DELAWARE.

METHOD OF PRODUCING WITH BACTERIA POISONS INTENDED FOR IMMUNIZING PURPOSES.

No Drawing. Application filed February 6, 1915. Serial No. 6,615.

*To all whom it may concern:*

Be it known that ERNST FRIEDBERGER, residing at 17 Sybelstrasse, Berlin-Charlottenburg, Germany, has invented certain new and useful Improvements in Methods of Producing with Bacteria Poisons Intended for Immunizing Purposes, of which the following is a specification.

My invention relates to immunizing media and has for an object a method for the production of a bacterial poison or virus suitable for immunizing purposes.

The invention in brief comprises treating a dense suspension of bacteria with amboceptor and complement, and separating after some time the toxic liquid from the precipitate by any suitable means such as, for example, centrifuging. In accordance with the method a toxin or virus is obtained which is efficacious for the setting up of active and passive immuity in an individual. The toxin obtained is the same as that which may be formed within the individual during the natural metabolistic processes, and it is therefore particularly suitable for devitalizing bacteria and for nullifying their action.

Another object of the invention is to produce a poison which may be administered in exact predetermined and desired quantity and quality with respect to the nature of the disease.

A further object of the invention is to render the product obtained stable at practically any temperature and free from germs.

Up to the present the method generally used for producing an immunizing agent or a vaccine consists in inoculating an individual with bacteria, the assimilation or disassimilation products of bacteria (toxins), dissolved substances derived from the body of animals, etc. Further, it has been proposed (cf. Folia Serologica. Vol. L, page 428, sub No. 428) to digest bacteria with gastric juice and to use the partially digested bacterial mass, after concentration in vacuo, as a vaccine. Such methods are based on the principle that the bacteria contain primary toxic substances which when set free within the organism effect the poisoning.

In contradiction to the above I have discovered as a result of many experiments that by the interaction of the amboceptors and complementary substances contained in the body of a being and the bacteria which may have come into said body a new poison is originated. This is rendered very probable by the fact that quite analogously acting poisons of very great efficiency are separated from amorphous albumen, for example, egg-albumen, or from animal cells, for instance, so-called dark spots or shadows in blood globules, which of itself is not poisonous at all. To obtain such a virus the albumen is left for a period of time in a suitable receptacle in contact with an homologous antagonist, centrifuged and the residue thus obtained is subjected to the action of a serum containing a complement. The liquid is separated from the residue and contains the above mentioned virus or poison, i. e., the so-called anaphylatoxine (cf. Zeitschrift fur Immunitatsforschung und Experimentelle Therapie, 1st part, original Volume IV, page 636 and following).

The quantity of bacteria sufficient for the preparation of a dose of the above mentioned poison capable of exerting an acute killing action, if contained in a test-tube under the proper conditions, is under certain circumstances many times smaller than the dose of the same bacteria which on being directly injected in the body gives rise to the same killing effect. This may be due to the fact that the formation of toxin in the body of the animal into which bacteria have been injected is so slow that at any given moment a dosage of the poison sufficient for exerting a killing action is not present, and that the poison, which for the time being has been produced may be modified and converted into non-poisonous modifications.

In accordance with my method, bacteria in a dense suspension are treated with a small quantity of amboceptor and its complement, and the liquid containing the immunizing poison, which is highly toxic, is separated from the precipitate, for example, by means of a centrifuge.

In carrying out my invention the following method may be used:

To a small quantity (colony) of typhus bacteria (i. e. 2 milligrams) suspended in 4 cubic centimeters of a physiological solution of common salt is added a small quantity (0.1 ccm.) of a serum containing amboceptor and after standing for about 24 hours at the temperature of an ice-chest the mass is centrifuged. To the sediment containing bacteria and amboceptor, which is freed by repeated lixiviation with a physiological solution of common salt from the last traces of serum, are added 4 ccm. of fresh normal cobaya-serum containing a complement. After standing for several hours at the temperature of an ice-chest during which time it is frequently shaken, the mass is again centrifuged. Upon injecting the cobaya-serum into the blood-current of a cobaya weighing about 200 g., it is ascertained that by the contact with the bacteria charged with amboceptor, the cobaya-serum has obtained such a toxicity that it is capable of killing an animal of the same genus in a few minutes and convulsions are induced. In order to prove that the proportion or percentage of complement in the poison or virus is important, control-tests have shown that when cobaya-serum is heated to 58° so as to be freed from its content of complement the same does not produce poison with bacteria containing amboceptor. However the contact at the temperature of an ice-chest, produces the poison more quickly than at normal body-temperature.

In the method forming the object of the present invention small quantities of bacteria are unsuitable, even when the latter are used in the reaction process in such a concentration that they are not completely killed by the amboceptor. It is necessary to operate with a high concentration of suspended bacteria in order to obtain a suitable immunizing virus or poison.

Further, only small quantities of amboceptor are required, as no killing of the bacteria is intended, so that the proportion of amboceptor contained in normal serum is quite sufficient and the contact of the bacteria with the normal serum suffices, because normal serum contains besides amboceptor the necessary complement.

The method herein described aims to prepare toxic substances and not a bacteriolysis which was formerly the object of the known processes and would have a deleterious effect. Also dead bacteria may be used without difficulty and with exactly the same result. On account of the fact that the method of producing the new poison corresponds to the reactions taking place in the organism, it can be used with greater advantage for active and passive immunizing in certain diseases, as for example typhus, tuberculosis, cholera, epidemic diseases of animals and the like. The immunizing substances when they are injected or inoculated into an individual produce an increasing or strengthening of the action which takes place in the organism itself. Thus said substances perform a part of the work which is to be performed by the similar natural immunizing substances which are normally formed in the body. The natural immunizing action, which takes place is highly assisted by the novel immunizing substance. Said immunizing substance acts therefore in a quite rational way in contradiction to those previously known. The former rely upon posterior or subsequent actions in the body, which are beyond the control of the administrator. They are never free from subsequent undesired or noxious actions, which never occur with my new substance, inasmuch as it can not only be injected in exactly, predetermined quantities, but also in a given state of reaction, according to the special conditions observed during production. Consequently, said poisons can also be used for producing antitoxin serum by treating animals with the poisons, after which the serum is obtained in the usual way by blood withdrawal and clotting.

I am aware that Buchner & Dieudonné (cf. Zentralblatt fur Bakteriologie VI 1889, page 10, all. 2 and Dieudonné, Immunitat, Schutzimpfung u. Serumtherapie, 1909 page 35–38 und 211) have reported methods specially adapted for diagnostic purposes, in which highly diluted suspensions of bacteria (a quantity of 2 milligram of an 18 hour agar-culture in bouillon in the proportion of 1:50000 or of a 24 hour bouillon culture 5000 times diluted with bouillon) in fresh blood or serum are brought into contact with a great quantity of amboceptor and a certain quantity of complement. By these experiments only the bactericidal property of the serum for special cases was ascertained, as the concentrations were very low and the amount of amboceptor very high. Said method operated with a dilution of 1:500000, whereas in the present method according to the example given typhus bacteria in a quantity of 2 mg. (taken up with the eyelet formed at the end of a wire) are used and treated with 4 ccm. serum. Therefore the concentration is very much higher.

Practical experiments have shown that the new toxic liquids which are not very stable may be converted by drying at low temperatures, preferably at temperatures below 40°, into dry substances which in a desiccator and in the dark may be conserved during a long time. In addition I have found that the dry substances can be heated to about 100° without becoming inactive, whilst the liquid becomes inactive at a temperature of about 65°. The dry substances may be dissolved in corresponding quantities of water without residue. This behaviour of the immunizing media obtainable according to the process forming the object of the present invention is of value, because it is possible in this manner not only to bring the substances in question into a suitable form for transport and conservation, but also to render them free from germs. A sterilizing may take place during the production by heating the bacteria charged with amboceptor to about 100°, that is, the bacteria which have been subjected to the first step of the method. The sterilization does not effect the further treatment with complement and the quality of the poison or virus is not impaired.

I claim:

1. A method of producing immunizing media which comprises treating a dense suspension of bacteria with amboceptor and with a serum containing a complement, and separating the resultant precipitate from the toxic liquid.

2. A method of producing immunizing media, which comprises treating a dense suspension of bacteria with amboceptor and with a serum containing a complement, separating the resultant precipitate by centrifuging from the toxic liquid, and drying said liquid at a low temperature.

3. A method of producing immunizing media which comprises treating a dense suspension of bacteria with amboceptor and complement, separating the precipitate from the toxic liquid by centrifuging, drying said liquid at a low temperature, and sterilizing the dry residue at a higher temperature.

4. A method of producing immunizing media which comprises treating a dense suspension of bacteria with amboceptor, sterilizing the mass, then adding a serum containing a complement and separating the precipitate by suitable means from the toxic liquid.

5. A method of producing immunizing media which comprises treating a dense suspension of bacteria with amboceptor, heating the mass to a temperature of about 100° C., then adding a serum containing a complement, and separating the precipitate from the toxic liquid.

6. A method of producing immunizing media which comprises treating a dense suspension of bacteria with amboceptor, heating the mass to a temperature of about 100° C. then adding a serum containing a complement and separating the precipitate from the toxic liquid by centrifuging.

7. A method of producing immunizing media which comprises treating a dense suspension of bacteria with normal serum and separating the resultant precipitate from the toxic liquid.

8. A method of producing immunizing media which comprises treating dead bacteria with amboceptor and complement and then separating the resultant precipitate from the toxic liquid.

9. A method of producing immunizing media which comprises treating a dense suspension of dead bacteria with normal serum, separating the resultant precipitate from the toxic liquid, drying said liquid at a low temperature and sterilizing the dry residue at a higher temperature.

10. A method of producing immunizing media which comprises suspending a colony of bacteria in a physiological solution of common salt, adding thereto a serum containing an amboceptor, maintaining the mass for several hours at the temperature of an ice-chest, centrifuging the mass, adding to the residue containing the amboceptor a serum containing a complement, maintaining the mass formed at the temperature of an ice-chest for several hours, and shaking the mass periodically during the exposure, and again centrifuging the said mass to separate the toxic liquid from the sediment.

11. A method for producing immunizing media which comprises suspending a colony of bacteria in a physiological solution of common salt, adding thereto a serum containing an amboceptor, maintaining the mass for several hours at the temperature of an ice-chest, centrifuging the mass, lixiviating the resulting residue containing an amboceptor, adding to the sediment a serum containing a complement, maintaining the mass for several hours at the temperature of an ice chest, shaking the mass periodically during the maintenance, again centrifuging the said mass to separate the toxic liquid from the sediment and then solidifying the liquid.

12. A method of producing an antitoxic serum, which comprises treating a dense suspension of bacteria with amboceptor and with a serum containing a complement, separating the precipitate by suitable means from the toxic liquid containing the immunizing poison, then inoculating an animal with said immunizing poison, and extracting the obtained serum from the body of the animal.

In testimony whereof I affix my signature in presence of two witnesses.

ERNST FRIEDBERGER.

Witnesses:
M. WEBER,
G. BOLLAERT.